T. B. KIRKWOOD.
Grain Winnower.

No. 93,721.

Patented Aug. 17, 1869.

Witnesses.
Wm Dean Overell
Geo. W. Mabee

Inventor.
T. B. Kirkwood

UNITED STATES PATENT OFFICE.

T. B. KIRKWOOD, OF DUBLIN, INDIANA.

IMPROVEMENT IN FANNING-MILLS.

Specification forming part of Letters Patent No. 93,721, dated August 17, 1869.

*To all whom it may concern:*

Be it known that I, T. B. KIRKWOOD, of Dublin, in the county of Wayne and State of Indiana, have invented a new and useful Improvement in Fanning-Mills; and I do hereby declare that the following is a full, clear, and exact description thereof, which will enable others skilled in the art to make and use the same, reference being had to the accompanying drawings, forming part of this specification, in which—

Figure 1:
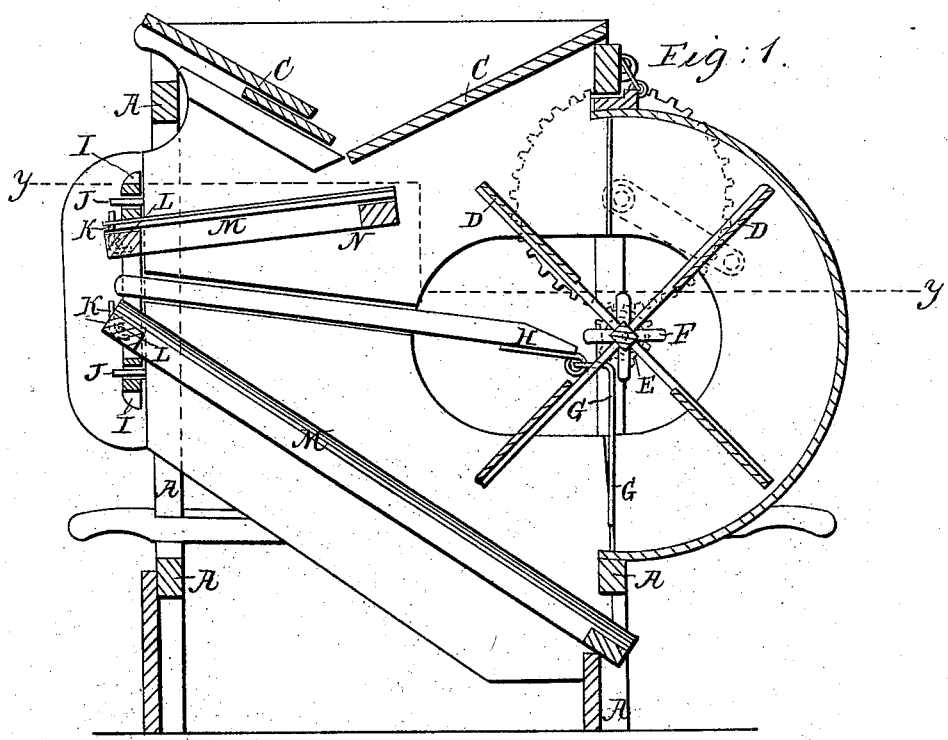
Figure 2:
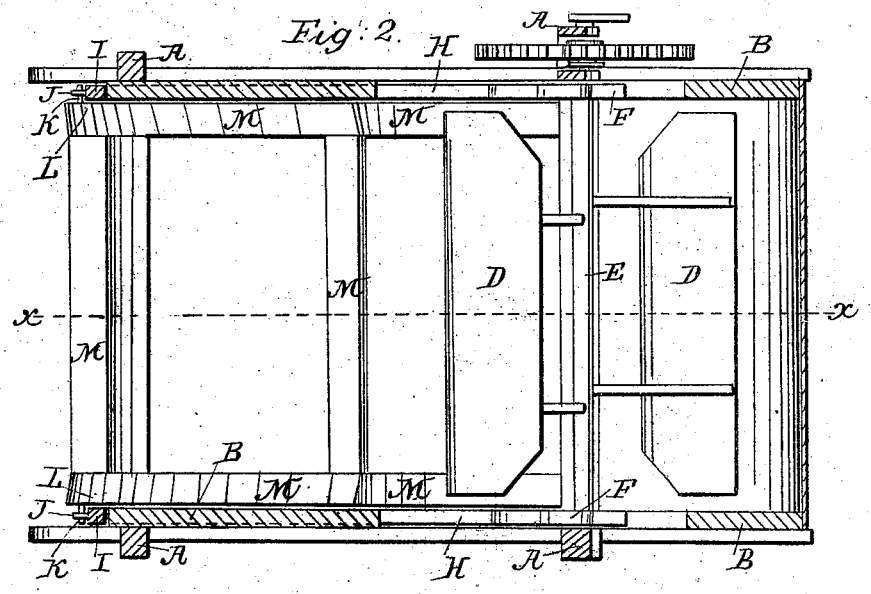

Figure 1 is a vertical section of a fanning-mill to which my improvements have been attached, taken through the line $x\,x$, Fig. 2. Fig. 2 is a detail horizontal section of the same, taken through the line $y\,y$, Fig. 1.

Similar letters of reference indicate corresponding parts.

My invention has for its object to improve the construction of fanning-mills, so that they may be simpler in construction, more effective in operation, and less expensive in manufacture, the screen-shoe being no longer necessary; and it consists in the manner of connecting and agitating the screens, as hereinafter more fully described.

A is the frame of the mill.

B is the casing.

C is the hopper.

D are the fans, which are attached to the fan-shaft E, and driven by means of a crank and gear-wheels in the ordinary manner.

F are armed wheels, which are secured to the fan-shaft E, close to the frame A of the mill. The wheels F may be made with two, three, four, or any other desired number of arms, according to the frequency with which it is desired to have the screens jarred or agitated.

G are springs, the lower ends of which are secured to the frame or casing of the mill, and the upper parts of which extend up into such a position that they may be struck and pushed toward the tail of the mill by the arms of the wheels F as the fan-shaft is revolved. The upper ends of the springs G are bent rearward to form a smooth shoulder for the arms of the wheels F to operate against. The upper ends of the springs G are connected with the forward ends of the bars H, which extend back through grooves or slots in the casing B, and to their rear ends are securely attached vertical bars I, extending along the rear edges of the casing B.

J are guide-pins attached to the rear edges of the casing B, and which pass through holes in the bars I, to serve as guides to said bars as they move back and forth.

To the rear side of the bars I are attached hooks or catches K, upon which hook pins or latches L, attached to and projecting from the rear ends of the sides of the screens or sieve-frames M, as shown in Figs. 1 and 2. The side bars of the screen-frames rest and slide upon pins N, or other suitable supports attached to the casing B. By this construction, as the springs G are released from the arms of the wheels F, by which the springs G, bars H, bars I, and screens M have been pushed back, the elasticity of the said springs draws the bars and screens forward with a sudden movement, sufficiently agitating the said screens.

Having thus described my invention, what I claim as new, and desire to secure by Letters Patent, is—

1. The screens M, when arranged to slide at their forward ends on pins N, set in the casing or wall B, and attached at their opposite ends to the vertical reciprocating bars I by means of hooks or catches L K, substantially as herein shown and described, for the purpose specified.

2. The combination of the bars H and springs G with the armed wheels F of the shaft E, when arranged substantially as shown and described, for the purpose of agitating the screens M, as set forth.

3. The combination of the armed wheels F, springs G, bars H, vertical bars I, guide-pins J, hooks and pins K L, screens M, and guides or supports N, with each other, and with the fan-shaft E, casing B, and frame A of the mill, substantially as herein shown and described, and for the purpose set forth.

T. B. KIRKWOOD.

Witnesses:
JOHN NAIRN,
JESSE GITHENS.